United States Patent
Sefi et al.

(10) Patent No.: US 12,542,514 B2
(45) Date of Patent: Feb. 3, 2026

(54) WIND-CLEANED PHOTOVOLTAIC SOLAR PANEL

(71) Applicant: DUSTOSS LTD., Har Adar (IL)

(72) Inventors: Hadar Sefi, Har Adar (IL); Yoel Sefi, Har Adar (IL); Lidor Mazouz, Har Adar (IL)

(73) Assignee: DUSTOSS LTD., Har Adar (IL)

( * ) Notice: Subject to any disclaimer, the term of this patent is extended or adjusted under 35 U.S.C. 154(b) by 30 days.

(21) Appl. No.: 18/037,108

(22) PCT Filed: Nov. 16, 2021

(86) PCT No.: PCT/IB2021/060602
§ 371 (c)(1),
(2) Date: May 16, 2023

(87) PCT Pub. No.: WO2022/101887
PCT Pub. Date: May 19, 2022

(65) Prior Publication Data
US 2023/0412120 A1     Dec. 21, 2023

Related U.S. Application Data

(60) Provisional application No. 63/113,997, filed on Nov. 16, 2020.

(51) Int. Cl.
*H02S 40/10* (2014.01)
*B08B 1/14* (2024.01)

(52) U.S. Cl.
CPC .............. *H02S 40/10* (2014.12); *B08B 1/143* (2024.01)

(58) Field of Classification Search
CPC ..... H01L 31/0475; H01L 31/05; H02S 40/10; H10F 19/20; H10F 19/90
See application file for complete search history.

(56) References Cited

U.S. PATENT DOCUMENTS

| | | | |
|---|---|---|---|
| 2012/0080074 A1* | 4/2012 | Hardikar | H02S 30/10 |
| | | | 136/251 |
| 2017/0093330 A1* | 3/2017 | Castellucci | H02S 20/32 |
| 2017/0197713 A1* | 7/2017 | Borman | G05D 1/101 |
| 2017/0210470 A1* | 7/2017 | Pardell | H02S 40/10 |
| 2018/0241343 A1* | 8/2018 | Jiang | F24S 40/20 |
| 2019/0089295 A1* | 3/2019 | Qian | H02S 40/10 |
| 2019/0280645 A1* | 9/2019 | Sefi | B08B 1/00 |
| 2021/0249992 A1* | 8/2021 | Rochman | B08B 13/00 |

FOREIGN PATENT DOCUMENTS

GB            2504530 A    *   2/2014   ............... B08B 1/16

* cited by examiner

*Primary Examiner* — Golam Mowla
(74) *Attorney, Agent, or Firm* — Rivka Friedman (57) ABSTRACT

A wind-cleaned photovoltaic solar panel (10) has an array of photovoltaic cells (12) under a panel surface (14). A two-dimensional array of cleaning elements (18) are anchored to the panel surface at cleaning-array locations (20) on the panel surface, at least one of which is spaced away from edges of the panel. Each of the cleaning elements (18) is an elongated wind-displaceable element having a length less than 50 percent of a width of the panel surface (14).

22 Claims, 10 Drawing Sheets

FIG. 10

WIND-CLEANED PHOTOVOLTAIC SOLAR PANEL

FIELD AND BACKGROUND OF THE INVENTION

The present invention relates to solar panels and, in particular, it concerns a wind-cleaned photovoltaic solar panel.

Solar energy is responsible for a rapidly-growing proportion of electricity generation worldwide, providing a clean energy source at competitive prices. As the efficiency of photovoltaic (PV) solar panels continues to rise, and their costs fall, PV solar panels have become a preferred option for capturing solar energy and converting it to electricity.

The efficiency of PV panels is impacted by an accumulation of dust and dirt on the panel surface in two distinct ways. Firstly, the presence of dirt on the panel increases surface heating and scattering of light, thereby resulting in less radiant energy penetrating into the panel to reach the PV cells. This effect reduces the panel efficiency, but does not disrupt the overall function of the panel, and is fully reversible when the panel is cleaned.

A second effect occurs when dirt on the panel is distributed unevenly, causing one or more PV cells to received significantly less radiant energy than the neighboring cells. Since groups of cells are connected in series, a significant mismatch of lower radiant energy reaching a certain cell limits the current which can flow through the entire group of cells, thereby reducing power output of the entire panel according to the least efficient cell. In installations in which a plurality of panels are connected in series, the weakest panel can in turn impact efficiency of the entire group of panels. Additionally, a dirty cell tends to act as a resistor, generating a local hot spot on the panel. Such a hot spot can impact the operation of the entire panel, and if the situation persists, may cause permanent damage to the panel.

It has been proposed to use various arrangements of lightweight cleaning elements spanning one or more panel that are displaced by the wind during normal weather conditions so as to brush away dust and dirt from the panel surface. In many cases, however, such cleaning arrangement result in non-uniform cleaning of the panel, and can therefore give rise to hot spots.

SUMMARY OF THE INVENTION

The present invention is a wind-cleaned photovoltaic solar panel.

According to the teachings of an embodiment of the present invention there is provided, a wind-cleaned photovoltaic solar panel comprising: (a) an array of photovoltaic cells under a panel surface, the panel surface having a length and a width, and terminating at panel edges; and (b) a two-dimensional array of cleaning elements, each cleaning element anchored to the panel surface at a cleaning-array location on the panel surface, at least one of the cleaning-array locations being spaced away from the panel edges, each of the cleaning elements comprising an elongated wind-displaceable element having a length less than 50 percent of the width of the panel surface.

According to a further feature of an embodiment of the present invention, the two-dimensional array of cleaning elements includes at least two cleaning-array locations spread across a width of the panel surface spaced away from the panel edges, and at least two cleaning-array locations spread along a length of the panel surface spaced away from the panel edges.

According to a further feature of an embodiment of the present invention, at least one of the cleaning-array locations is located at the center of a photovoltaic cell.

According to a further feature of an embodiment of the present invention, each of the photovoltaic cells has a cleaning-array location at its center.

According to a further feature of an embodiment of the present invention, at least one of the cleaning-array locations is located at a marginal area adjacent to at least two photovoltaic cells.

According to a further feature of an embodiment of the present invention, at least one of the cleaning-array locations is located at a marginal area adjacent to at least three photovoltaic cells.

According to a further feature of an embodiment of the present invention, at least one of the cleaning elements comprises a strip of flexible material having a thickness less than 80 microns, a width less than 1.5 cm, and a wind-displaceable length less than 50 cm.

According to a further feature of an embodiment of the present invention, at least one of the cleaning elements has a wind-displaceable length between 8 centimeters and 35 centimeters.

According to a further feature of an embodiment of the present invention, at least one of the cleaning elements has a wind-displaceable length between 65 percent and 110 percent of a di stance between adjacent cleaning-array locations.

According to a further feature of an embodiment of the present invention, at least one of the cleaning elements is anchored to the panel surface via an anchoring arrangement attached to the panel surface.

According to a further feature of an embodiment of the present invention, the anchoring arrangement comprises a barbed projection for engaging a cleaning element.

According to a further feature of an embodiment of the present invention, the anchoring arrangement is integrated with a cartridge containing a storage volume storing a length of material for deployment as a replacement cleaning element.

According to a further feature of an embodiment of the present invention, the cartridge has a reflective outer surface for reflecting sunlight towards the photovoltaic cells.

According to a further feature of an embodiment of the present invention, the cartridge is formed primarily from translucent material.

According to a further feature of an embodiment of the present invention, at least one of the cleaning elements passes through a channel extending from a back surface of the panel through the panel surface.

According to a further feature of an embodiment of the present invention, there is also provided a cartridge associated with the back surface of the panel for the cleaning element, the cartridge containing a storage volume storing a length of material for deployment as a replacement cleaning element.

According to a further feature of an embodiment of the present invention, there is also provided a cartridge associated with at least one of the cleaning elements, the cartridge containing a storage volume storing a length of material, contiguous with the cleaning element, for deployment as a replacement cleaning element, the length of material including weakened tear-lines to facilitate disconnection of an old cleaning element when deploying a replacement cleaning element.

According to a further feature of an embodiment of the present invention, the length of material is provided with retaining features, spaced along its length, for defining a series of stopping positions for the length of material relative to the cartridge corresponding to deployment of successive portions of the length of material as replacement cleaning elements.

According to a further feature of an embodiment of the present invention, the panel is a flexible panel.

According to a further feature of an embodiment of the present invention, there is also provided a flexible bag associated with at least one of the cleaning elements, the flexible bag containing a storage volume storing a length of material, contiguous with the cleaning element, for deployment as a replacement cleaning element.

According to a further feature of an embodiment of the present invention, at least one of the cleaning elements is anchored at two ends to the panel surface.

There is also provided according to the teachings of an embodiment of the present invention, a photovoltaic solar panel comprising: (a) an array of photovoltaic cells under a panel surface; and (b) a plurality of indicator elements, each indicator element anchored to the panel surface at a location associated with a corresponding photovoltaic cell or group of cells, each indicator element being configured to undergo a visible change when exposed to a temperature in excess of a threshold temperature, the threshold temperature being at least 80 degrees Celsius.

There is also provided according to the teachings of an embodiment of the present invention, a photovoltaic solar panel comprising: (a) an array of photovoltaic cells under a panel surface; and (b) at least one cleaning element dispenser attached to the solar panel, the cleaning element dispenser supporting a wind-displaceable length of an elongated wind-displaceable cleaning element, the dispenser having an internal volume for storing a length of material selectively deployable as one or more replacement cleaning elements.

According to a further feature of an embodiment of the present invention, the dispenser is attached to a back surface of the panel, and wherein the wind-displaceable cleaning element extends through a channel passing through the panel from the back surface to the panel surface.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a wind-cleaned photovoltaic solar panel.

The principles and operation of panels according to the present invention may be better understood with reference to the drawings and the accompanying description.

By way of introduction, the present invention addresses shortcomings which have been identified in conventional devices employing wind-displaced cleaning elements to clean solar panels. Specifically, in many solar panel installations, common weather conditions provide wind in a predominant direction or range of directions, resulting in selective displacement of cleaning elements over only part of the area that needs to be cleaned. The resulting partial cleaning gives rise to variations in the performance of different cells, as described above, reducing panel efficiency and potentially causing hot spots and damage to the panel.

The present invention is based on the observation that relatively short and lightweight cleaning elements can generate sufficient "fluttering" effects to reach an intended region of coverage more effectively than a longer cleaning element, even under weather conditions with limited changes in wind direction. Without in any way limiting the scope of the present invention, this enhanced effectiveness of short cleaning elements is believed to be due to various turbulence effects caused by airflow over the cleaning element itself and/or by variations in air speed between layers of air at different distances from the panel surface. The use of cleaning elements which are short compared to the dimensions of a panel requires anchoring of at least some of the cleaning elements within the area of the panel surface, thereby running contrary to conventional assumptions that attachment of any object to the panel surface should be avoided.

Figure 1:
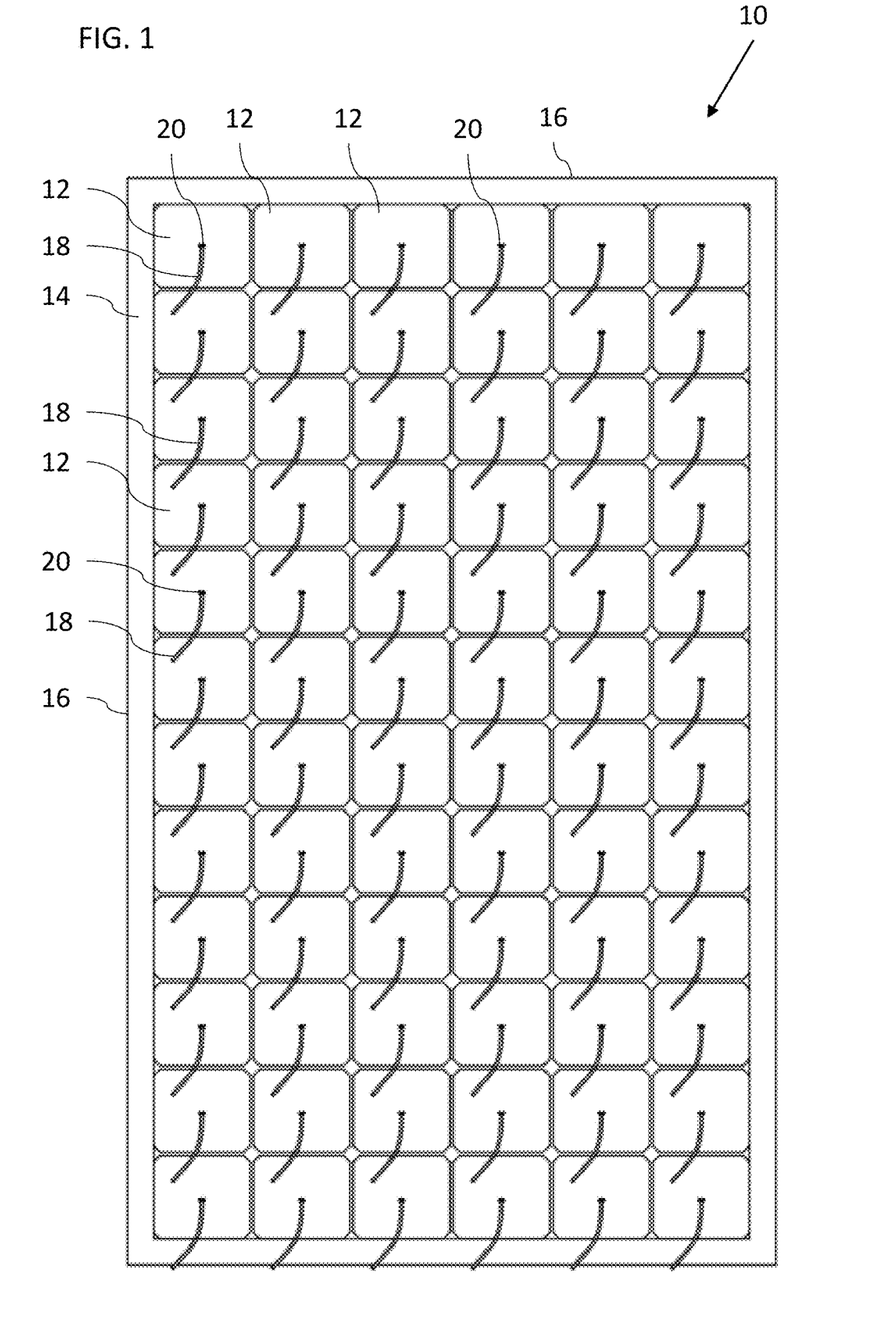
FIG. 1 is a schematic front view of a solar panel, constructed and operative according to an embodiment of the present invention, including an array of cleaning elements.
Figure 2:
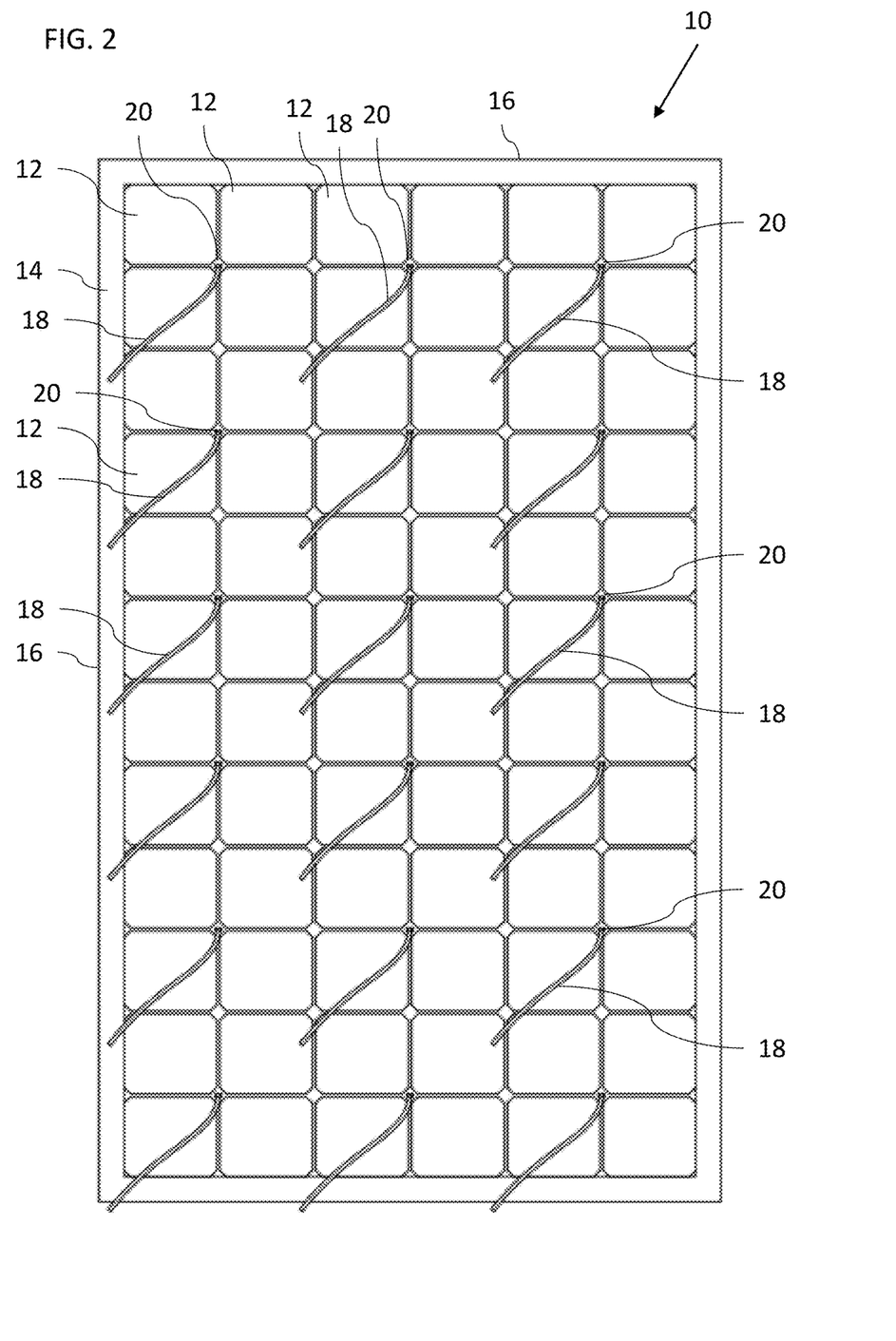
FIG. 2 is a schematic front view of a variant implementation of the panel of FIG. 1.
Figure 3:
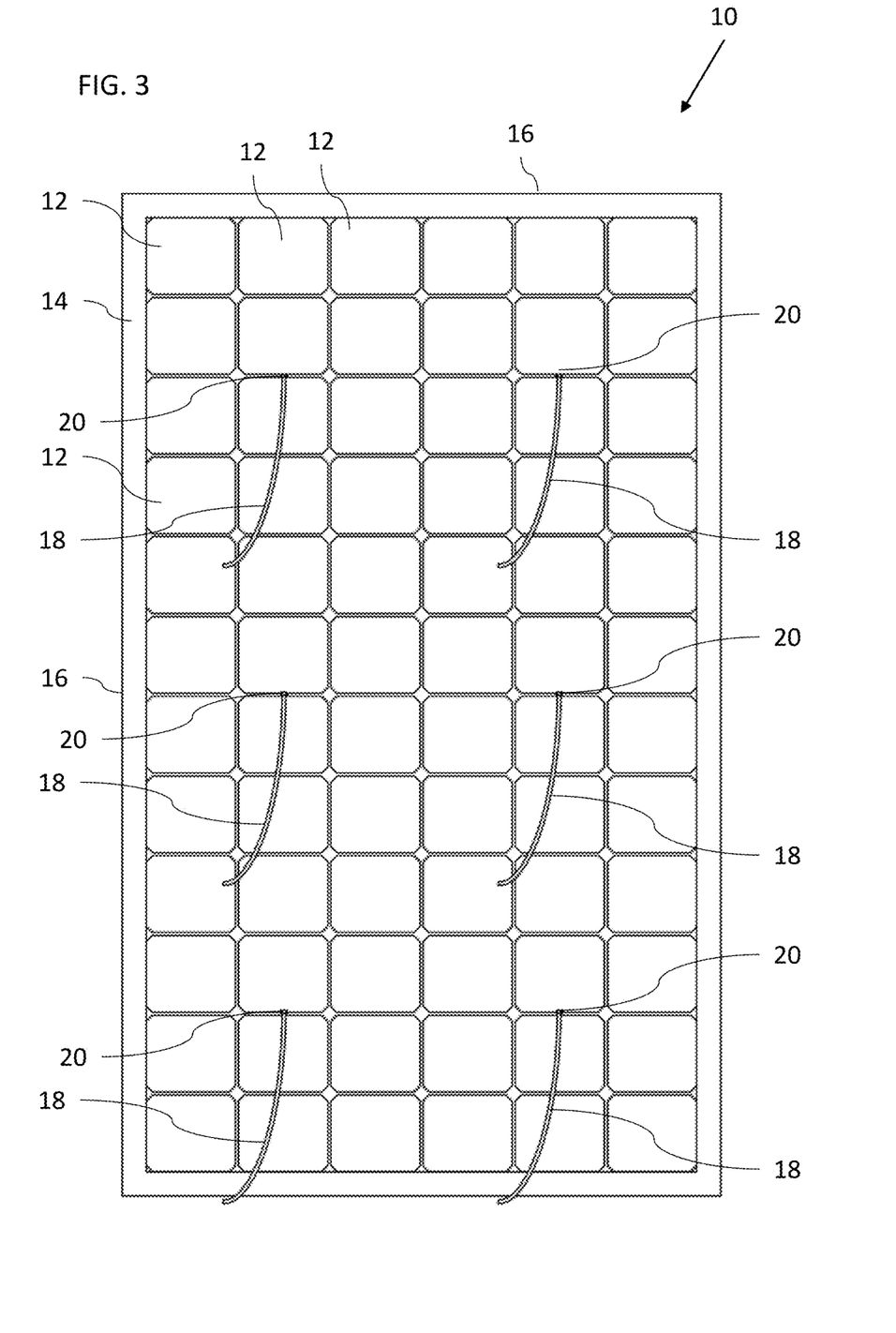
FIG. 3 is a schematic front view of a further variant implementation of the panel of FIG. 1.

Referring now to the drawings, FIGS. 1-3 illustrate exemplary embodiments of a wind-cleaned photovoltaic solar panel, generally designated 10, constructed and operative according to the teachings of the present invention. Generally speaking, solar panel 10 includes an array of photovoltaic cells 12 under a panel surface 14. Panel surface 14 has a length L (major dimension) and a width W (smaller than or equal to the length), and terminates at panel edges 16. The solar panel 10 also includes a two-dimensional array of cleaning elements 18, each cleaning element anchored to the panel surface at a cleaning-array location 20 on the panel surface. At least one, and preferably all, of the cleaning-array locations 20 are spaced away from the panel edges 16. Each cleaning element 18 is an elongated wind-displaceable element having a length that is less than 50 percent, and preferably less than 40 percent, of the width W of the panel surface.

The two-dimensional array of cleaning elements can be any arrangement of at least three cleaning array locations arranged non-collinearly in a manner such that the regions that can be reached by each of the cleaning elements together cover the entire area of PV cells. Typically, the array is a rectangular array of at least two-by-two cleaning-array locations, each with a separate cleaning element. Alternatively, a staggered array, such as a hexagonal array, may be used. The relative dimensions of the array typically correspond to the form factor (e.g., aspect ratio) of the panel, with 2×2, 3×3 etc. being suitable for a square panel, and 2×3, 2×4, 3×6 etc. being suitable for correspondingly-proportioned rectangular panels.

FIG. 1 illustrates a first option according to which the cleaning-array locations 20 are located at the center of the photovoltaic cells 12. The term "center" here need not be geometrically precise, but refers to a location on each PV cell that is away from the edges, and such that cleaning of the cell occurs through wind displacement of the cleaning element in all directions about its location of attachment. In this non-limiting example, the panel illustrated has a 1:2 aspect ratio, with 6×12 PV cells. In certain particularly preferred implementations, each cell is provided with a cleaning-array location 20 at its center, fitted with a cleaning element 18. This implementation ensures that the cleaning effect on each PV cell is substantially identical, thereby providing a highly-effective solution to avoid the aforementioned hot spots that result from non-uniform cleaning between cells. This solution also employs particularly short cleaning elements, with lengths similar to or shorter than the dimensions of the individual cells in the panel, thereby optimizing the beneficial fluttering effects that are observed with short cleaning elements. These advantages come at the expense of a potentially labor-intensive assembly process, which may largely be addressed by automation of the assembly, and some degree of shading within the cells, which can be kept to acceptably low values according to various features of the preferred implementations to be described further below.

A further benefit of deployment of individual cleaning elements associated with each cell can be to facilitate prompt identification of hot spots, should they occur. In the absence of specialized thermal imaging equipment, hot spots on solar panels are typically difficult to identify and locate, since there are no visible indications that a particular cell is overheating during operation. According to one particularly-preferred aspect of the present invention, some part of the cleaning element and/or its attachment arrangement to the panel surface is implemented using material which undergoes a visible change, such as a thermochromic color change (preferably irreversible), a physical change such as contracting, curling or rolling up, and/or which melts, disintegrates or dislodges itself at a threshold temperature chosen to be above the normal operating temperature of the panel, but likely to be reached in case of a significant hot spot occurring. Typically, the threshold temperature is chosen to be above 80 degrees Celsius, and preferably somewhere in the range of 100-200 degrees Celsius. This allows immediate identification of a location on a panel at which a hot spot has occurred by the fact that the cleaning element at that location has undergone a visible change or has disappeared. Furthermore, the change remains visible even when the problematic cell is no longer hot, such as when the sun is low in the sky or has set, when thermal imaging may be unable to identify the problematic cell.

Although an arrangement with one cleaning/indicator element per PV-cell provides the highest resolution information about hot spots, this hot spot indicator function is also of value where a single element serves a group of cells, for example, being mounted at a marginal area between two or more cells (as in alternative layouts exemplified below), where the element will provide an indication if one of the adjoining cells has become a hot spot.

It should be noted that a system for identifying hot spots as described above is an independent aspect of the present invention which may be used to advantage with indicator elements which do not perform a cleaning function. For example, an indicator element (too short or otherwise unsuited for providing effective cleaning) may be attached to, or otherwise integrated with, some or all of the PV cells, or with small groups of the cells, to provide a visual indication (such as those options listed above) when the cell, or at least one cell of the group, has become a hot spot.

Turning now to FIGS. 2 and 3, these illustrated further options according to which each cleaning-array location 20 is located at a marginal area adjacent to at least two photovoltaic cells. In the case of FIG. 2, the cleaning-array locations 20 are located at marginal areas adjacent to corners of at least some of the photovoltaic cells, which would mean that they border at least three PV cells (in the case of staggered rows), and in the case of a rectangular grid of PV cells, typically four cells, as shown in FIG. 2. These marginal areas around each cell, and particularly at the corner regions, typically have some area which is not effective for absorption of radiant energy. Anchoring of the cleaning-array locations 20 at these locations thereby minimizes any impact of the anchoring arrangements (details to be discussed below) on efficiency of light absorption. In the case of FIG. 2, each cleaning element 18 is deployed and sized to clean four PV cells adjacent to the cleaning-array location 20 at which it is anchored. An exemplary array of 6×12 PV cells (72 total) can therefore be cleaned by an array of 3×6 cleaning elements 18 (18 cleaning element in total).

In the case of FIG. 3, each cleaning-array location 20 is placed centrally to a group of 3×4 PV cells (12 total), illustrating that the coverage of each cleaning element 18 does not necessarily need to be square. In this case, the 72 cells of the array can be covered by the cleaning area of six cleaning elements 18. It will be noted that there is slightly more overlap between the "reach" of the cleaning elements across the width of the panel than along the length.

In each implementation, the wind-displaceable length of the cleaning elements is preferably chosen to be sufficient to reach the extremities (diagonal) of the region to be cleaned by that element, but not significantly greater than the distance between adjacent cleaning array location, so as to minimize the risk of one cleaning element becoming tangled around the base of another. In most cases, a preferred length is between 65 percent and 110 percent of a distance between adjacent cleaning-array locations. Where the spacing along the two axes of the array is different, the length is preferably at least 65 percent of the smaller spacing and not more than 110 percent of the larger spacing. In absolute terms, in most cases, the wind-displaceable length of the cleaning elements is less than 50 centimeters, and preferably in the range between 8 centimeters and 35 centimeters. The phrase "wind-displaceable length" is used herein in the description and claims to refer to the length of the cleaning element which is free to be displaced by the wind around the anchoring location, and disregarding any length which is firmly held or otherwise constrained from fluttering motion in the wind.

The cleaning element is most preferably implemented as a simple strip (ribbon) of polymer material which is chosen to be flexible, stable under an extended period of exposure to sunlight, and sufficiently strong mechanically to withstand repeated buffeting against the surface of the solar panel. Suitable examples of material include, but are not limited to: polytetrafluoroethylene (PTFE), polypropylene with UV-protective additives, polyethylene with UV-protective additives, and various fabrics including but not limited to microfiber fabrics.

In order to provide high mobility under conditions of light-to-moderate wind, the cleaning elements may advantageously be implemented as a strip of flexible material having a thickness less than 80 microns, and in certain particularly preferred cases, between 20-50 microns, and a width less than 1.5 cm, and in certain particularly preferred cases, between 5-8 mm width. These parameters, together with a wind-displaceable length of no more than 35 cm, tend to impart to the cleaning elements properties of high mobility and a tendency to undergo rapid fluttering motions under light-to-moderate wind conditions. Although a flat strip is believed to be particularly advantageous, alternative implementations may employ other wind-displaceable cleaning elements such as various strings, threads, wires, etc., including branched or fraying elements.

The use of a two-dimensional array of cleaning element distributed across the panel, such as in the examples of FIGS. 1-3, provides a number of advantages. Firstly, given the short length of the cleaning elements, they are more inclined to undergo rapid fluttering motion in a range of wind conditions, thereby achieving more uniform cleaning than would be achieved by longer cleaning elements under similar conditions. Furthermore, even in a case where weather conditions are such that full cleaning is not achieved, as may occur for example in cases of a steady wind in a constant direction, any pattern of partial cleaning occurs similarly for each group of cells served by a cleaning element, and is therefore repeated multiple times across the panel. The fact that any region of incomplete cleaning occurs similarly in multiple locations across the panel ensures that any reduction in efficiency is a diffuse effect, and does not result in formation of hot spots.

Turning now to FIGS. 4A-9, a number of different options for anchoring arrangements for anchoring cleaning elements 18 at cleaning-array locations 20 will be described. In certain implementations, it is sufficient to anchor the cleaning elements 18 at cleaning-array locations 20 by sticking the cleaning elements to the panel directly, for example, by a layer of adhesive integrated with the cleaning element itself, or using single-sided or double-sided adhesive tape. In some cases, it may be advantageous to provide an anchoring configuration which can be used for attaching successive cleaning elements at a certain location, thereby facilitating rapid changing of cleaning elements which have reached the end of their effective life. According to a first group of implementations, the cleaning elements may be anchored to anchoring elements, such as a hook, clip or other anchoring element 22 that is attached to the front surface 14 of panel such as via a layer of adhesive 24. In some particularly preferred implementations, the anchoring element 22 has a barbed projection 26 for engaging a cleaning element 18. Optionally, barbed projection 26 may be flexible, allowing it to briefly deform while cleaning element 18 is being engaged with the anchoring element 22 and then to return to its initial state to prevent separation of the cleaning element from the anchoring element. Alternatively, the cleaning element may undergo temporary deformation, such as momentary stretching of a hole 28 of cleaning element 18 (FIG. 4C) in order to pass over the barbed projection 26. The cleaning element is then typically positively retained on the anchoring element 22 until forcibly torn off by an operator.

Figure 4A:
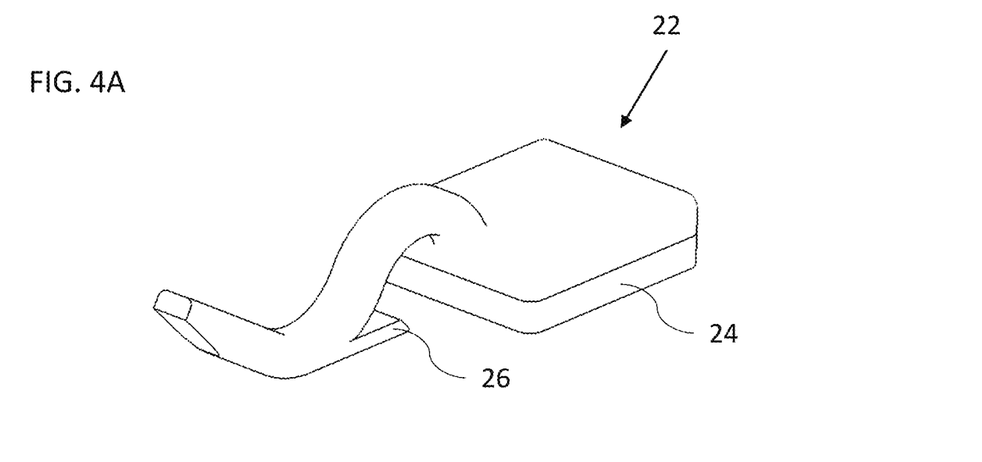
FIG. 4A is a schematic isometric view of an anchoring element for mounting a cleaning element on a solar panel according to an aspect of the present invention.
Figure 4B:
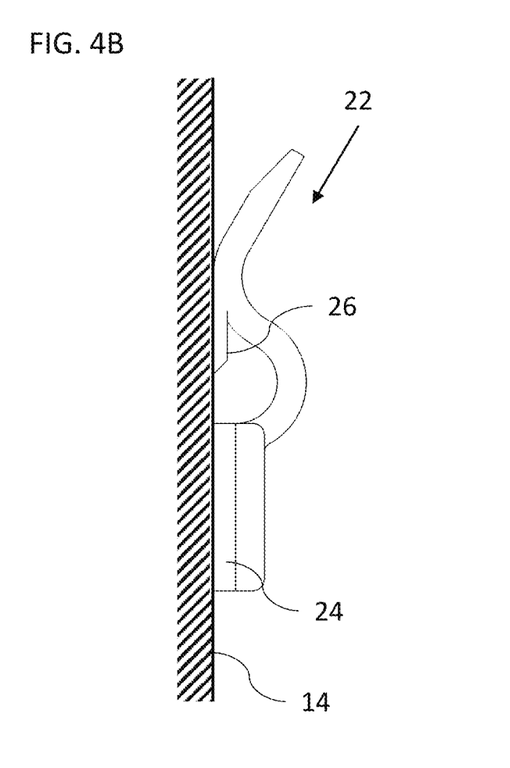
FIG. 4B is a schematic side view showing the anchoring element of FIG. 4A attached to the front surface of a panel.
Figure 4C:
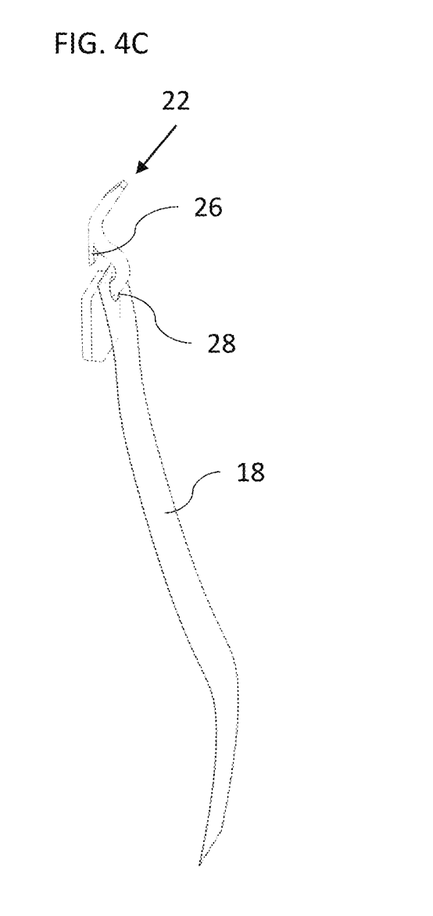
FIG. 4C is a schematic isometric view showing a cleaning element attached to the anchoring element of FIG. 4A.

In the non-limiting example illustrated here, anchoring element 22 is implemented as a clip which forms a partial loop facing towards the front surface 14 of the solar panel (see FIG. 4B). This configuration is advantageously a particularly low-profile configuration. However, the use of barbed projection 26 would facilitate effective retention of the cleaning element even if the anchoring element were an upright stud with a barbed projection.

Anchoring element 22 is advantageously implemented as a small element which typically has a width dimension typically no more than about 10 mm, and in certain preferred cases no more than about 8 mm. The projecting structure including barbed projection 26 may also be significantly narrower, typically in the 1-2 mm range, such that the total area of anchoring element 22 may be no more than about 1 square centimeter. This renders the shading effect of anchoring element 22 sufficiently small that its impact on the solar panel efficiency is acceptably low, even where the anchoring element is mounted centrally within a PV cell. The shading effect can be further ameliorated by employing transparent or translucent materials for the anchoring element.

Where anchoring elements 22 can be mounted along the margins of the PV cells (such as in FIGS. 2 and 3), the longer dimension of the anchoring elements 22 is preferably aligned with one of the margins, thereby reducing any overlap of the anchoring element with the PV cells to a minimum.

Turning now to FIGS. 5A-9, these illustrate a number of implementations in which the anchoring arrangement is integrated with a container, referred to herein interchangeably as a dispenser or cartridge 30 containing a storage volume storing a length of material 32 for deployment as a replacement cleaning element. The provision of such a dispenser to allow convenient storage and easy deployment of replacement lengths of cleaning element is believed to be of patentable significance in its own right, independent of the other features of the present invention described herein. In the case of FIGS. 5A-7B, cartridge 30 is in the form of a container which is attached to front surface 14 of the solar panel, in a manner and position similar to that described above for anchoring element 22. In the case of FIG. 5C, the stored length of material 32 is provided as a roll of material within cartridge 30. The cleaning element currently in use extends as a tail from an opening 34, where it is held by a clamping element 36. In the case shown here, clamping element 36 is a wedge-shaped clip which grips the cleaning element firmly when pressed into opening 34. Clearly, alternative clamping arrangements could be used.

Figure 5A:
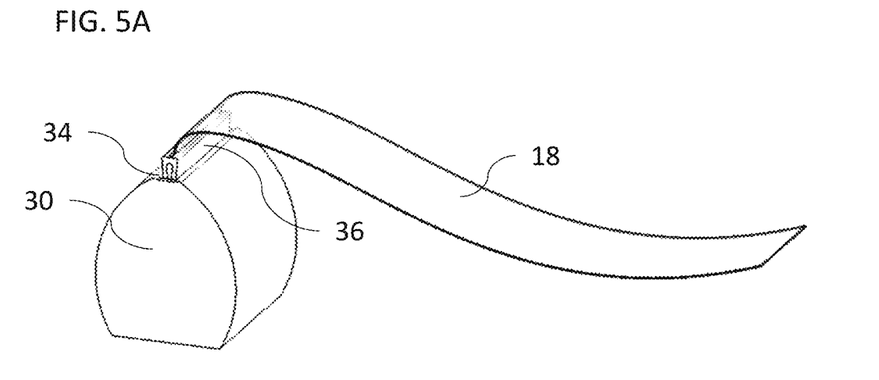
FIG. 5A is a schematic isometric view of a cartridge for anchoring a cleaning element to the solar panel and storing a length of material for replacement cleaning elements.
Figure 5B:
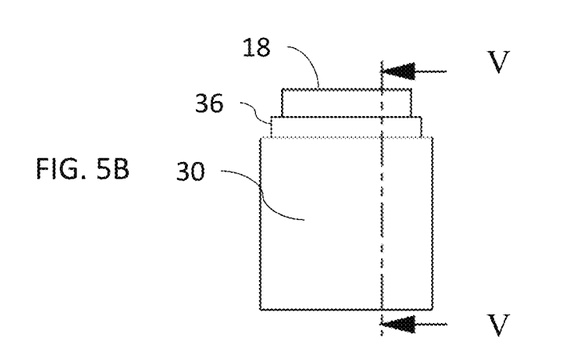
FIG. 5B is an end view of the cartridge of FIG. 5A.
Figure 5C:
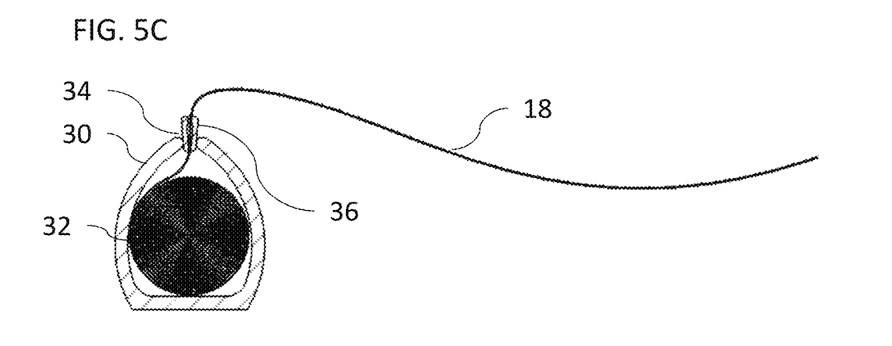
FIG. 5C is a cross-sectional view taken along the line V-V in FIG. 5B.

Cartridge 30 facilitates rapid replacement of cleaning elements which are nearing the end of their useful life. Specifically, when it is desired to replace the cleaning element, the clamping element 36 can be loosened from opening 34 so as to unclamp the material 32. A new desired length of material for the replacement cleaning element is then drawn out from the cartridge 30, and clamping element 36 is forced back into opening 34 so as to clamp the new cleaning element in place. The excess length of the old cleaning element can then be severed, such as with scissors.

Figure 6:
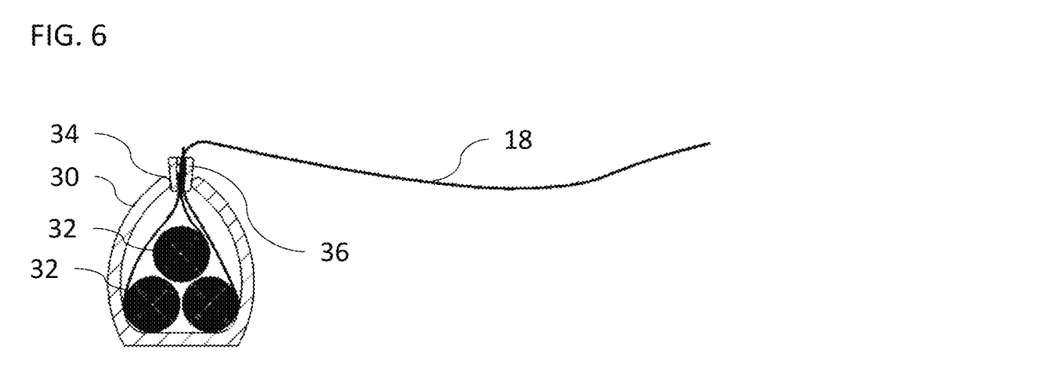
FIG. 6 is a view similar to FIG. 5C showing a variant implementation of the cartridge.
Figure 7A:
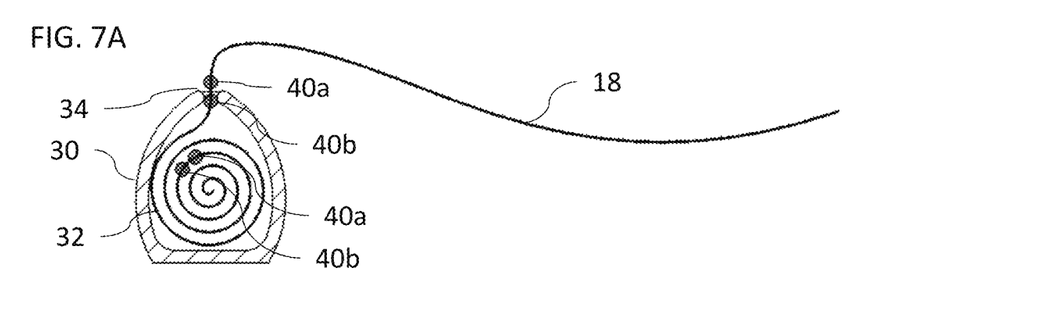
FIG. 7A is a view similar to FIG. 5C showing a further variant implementation of the cartridge employing a length of material for replacement cleaning elements having retaining elements.
Figure 7B:
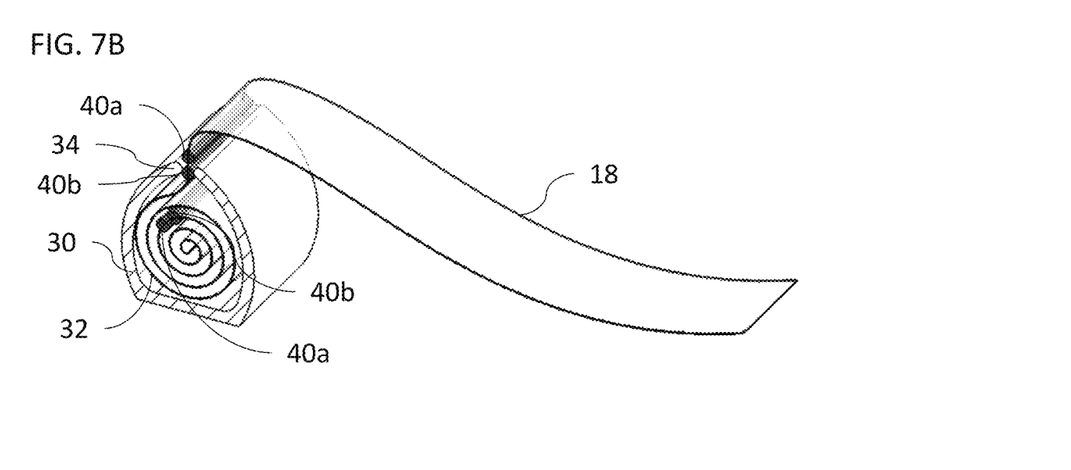
FIG. 7B is a cut-away isometric view of the cartridge of FIG. 7A.
Figure 7C:
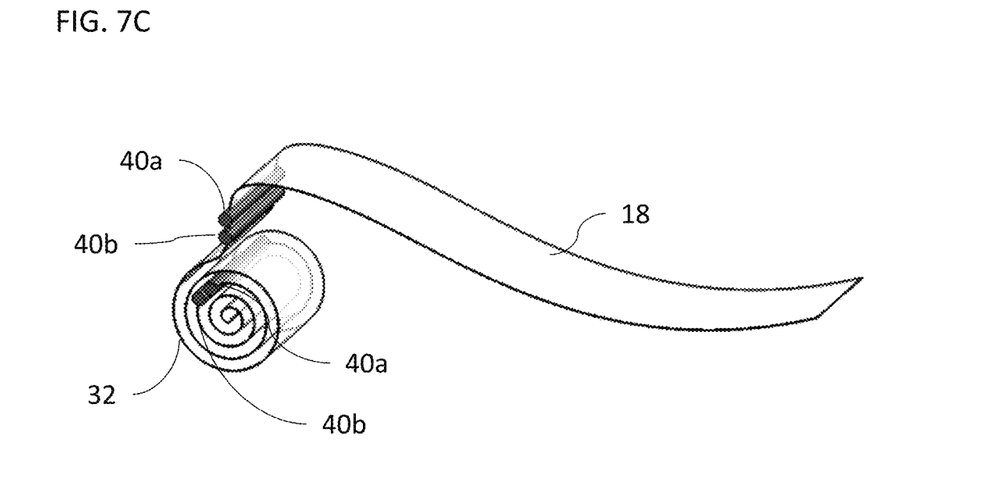
FIGS. 7C and 7D are an isometric view and a side view, respectively, of the length of material for forming replacement cleaning elements shown without the cartridge.
Figure 7D:
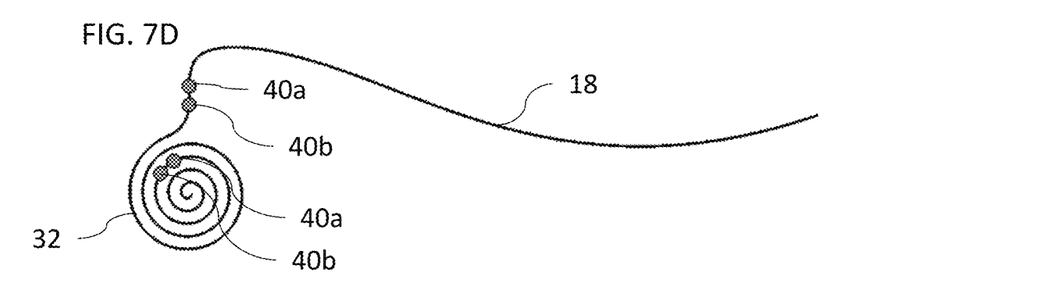
Figure 7E:
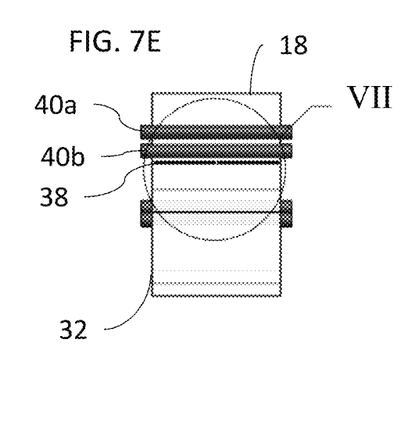
FIG. 7E is a front view of the length of material from FIG. 7D.
Figure 7F:
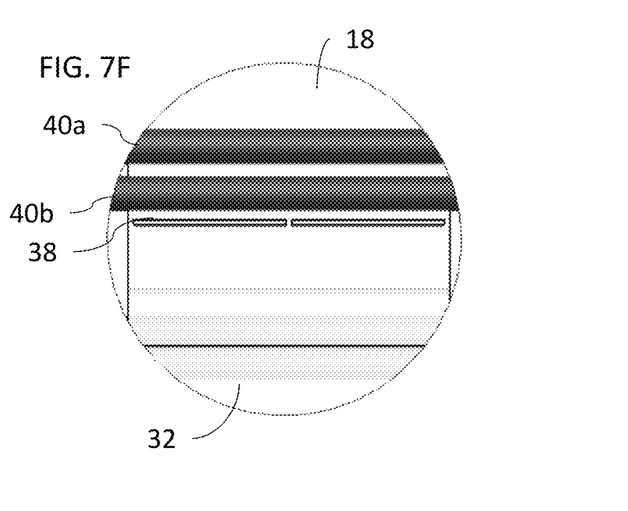
FIG. 7F is an enlarged view of the region of FIG. 7E designated VII.

FIG. 6 illustrates a variant implementation of cartridge 30 in which the length of material is provided as a plurality of distinct rolls of material, each of which may be sufficient for one or more replacement cleaning element. Optionally, the end of the rolls of material not yet in use may be temporarily fastened to opening 34 or to clamping element 36 so as to be readily available to be manually drawn out when needed.

FIGS. 7A-7F illustrate a further variant implementation according to which the length of material 32 for forming replacement cleaning elements includes weakened tear-lines 38 (FIGS. 7E and 7F) to facilitate disconnection of an old cleaning element when deploying a replacement cleaning element. Most preferably, the length of material 32 also includes retaining features 40a, 40b, spaced along its length, for defining a series of stopping positions for the length of material 32 relative to cartridge 30, corresponding to deployment of successive portions of the length of material as replacement cleaning elements. In the non-limiting example illustrated here, retaining features 40a, 40b are implemented as resilient elements that are sized to pass through opening 34 only when a certain threshold of force is applied, greater than that occurring under normal operational conditions due to wind. This allows an operator to manually pull the resilient elements through the opening when it is desired to replace the cleaning element simply by pulling on the old cleaning element, and to draw out a new length of cleaning element ready for use. The old cleaning element can then be removed by tearing at the weakened tear-line 38, leaving the newly deployed cleaning element ready for use.

In the non-limiting example illustrated here, the predefined stopping positions are each defined by a pair of retaining features, where one feature 40a is pulled beyond the opening while the other 40b remains inside the cartridge. This provides positive gripping of the cleaning element against displacement outwards (overextension) or inwards (retraction into the cartridge) during use. In certain cases, it may be sufficient to provide a single retaining feature 40b to prevent overextension of the cleaning element, while retraction back into the cartridge will typically not occur under normal operating conditions.

Although the cartridge 30 has been illustrated in FIGS. 5A-7B as having a particular structural shape, it should be noted that a similar functionality may be provided by a flexible bag (not shown), associated with each of the cleaning elements, and containing a storage volume storing a length of material, contiguous with the cleaning element, for deployment as a replacement cleaning element. The use of a flexible bag may be advantageous to minimize any mechanical obstruction, for example, during washing of the panel for supplementary cleaning. A flexible bag implementation is also particularly suited to implementations employing flexible solar panels.

In any of the aforementioned implementations, impact on the amount of radiant energy reaching the PV cells is preferably minimized by any combination of:

Minimizing the dimensions of the anchoring arrangement, which is typically no more than 1-2 millimeters wider than the cleaning element width, and typically has a total attachment area of less than 1 square centimeter, and most preferably no more than about 0.7 square centimeters.

Mounting the anchoring configuration in marginal regions so that at least part of its attachment area lies outside the radiation-absorbing area of the cells.

Forming the cartridge or other anchoring configuration with a reflective outer surface for reflecting sunlight towards the PV cells.

Forming the cartridge or other anchoring configuration at least in part from translucent material, to allow passage of light through the cartridge into the PV cells.

Figure 8A:
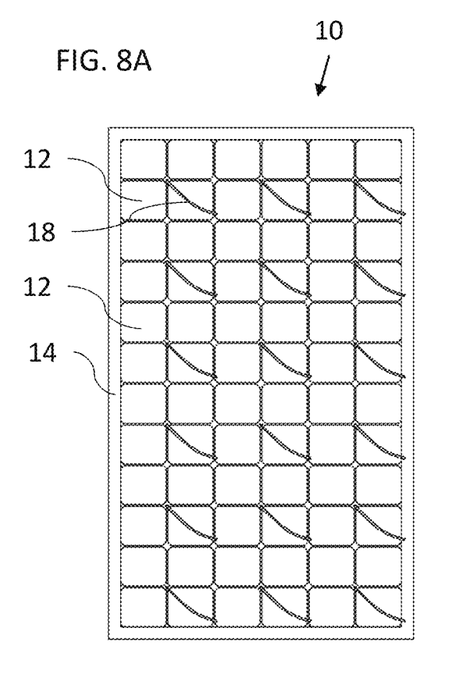
FIGS. 8A and 8B are front and back views, respectively, of an implementation of the panel of FIG. 2.
Figure 8B:
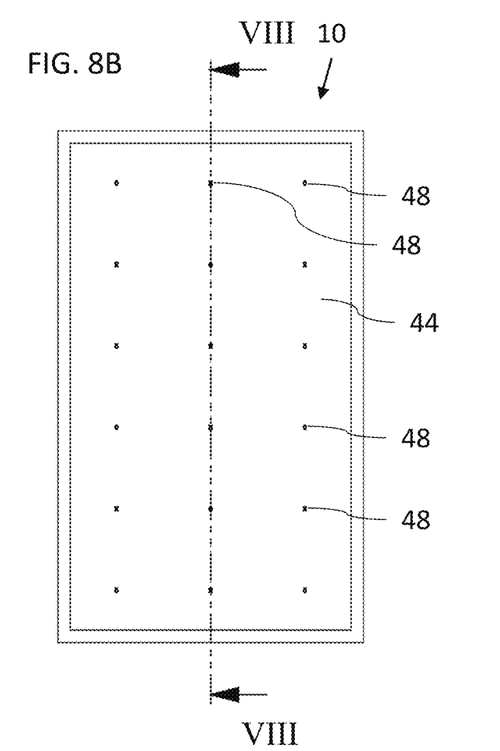
Figure 8C:
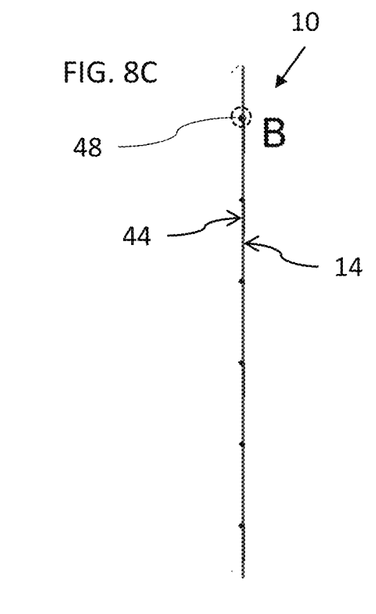
FIG. 8C is a cross-sectional view taken along the line VIII-VIII in FIG. 8B.
Figure 8D:
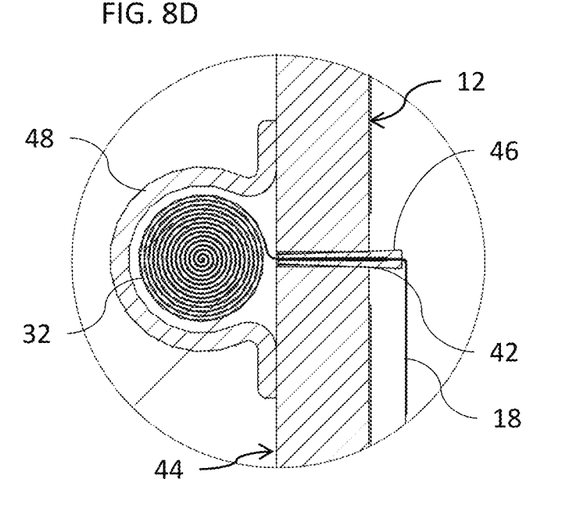
FIG. 8D is an enlarged view of the region of FIG. 8C designated B.
Figure 9:
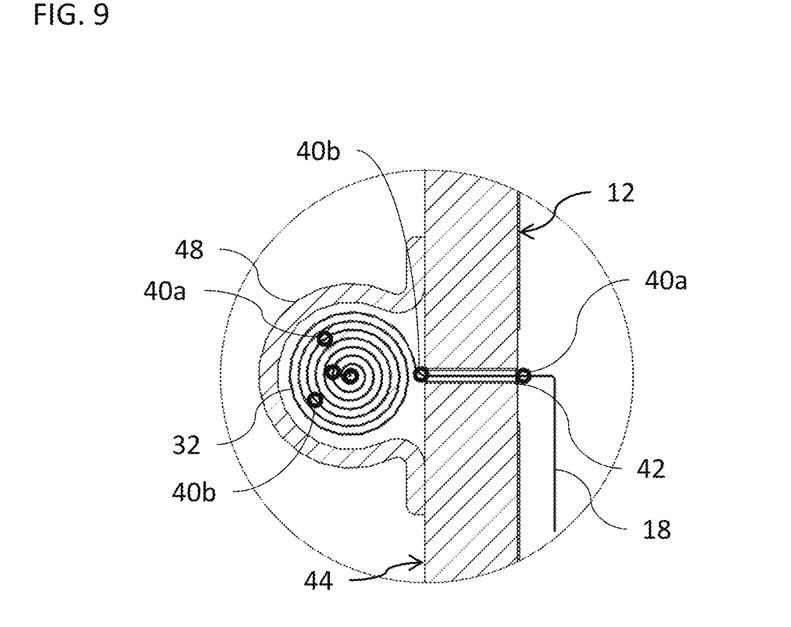
FIG. 9 is a view similar to FIG. 8D showing a variant implementation employing a length of material for replacement cleaning elements having retaining elements.

Turning now to FIGS. 8A-9, there illustrate a further subset of implementations according to which some or all of the cleaning elements 18 pass through channels 42 extending from a back surface 44 of the panel through panel surface 14. This typically requires modification of the panel manufacture process in order to provide channels 42 suitably positioned so as not to disturb any internal components, and sealed and electrically insulated so as not to compromise the internal components of the panel and not to expose those components to moisture or other damaging environmental conditions, all as will be clear to a person ordinarily skilled in the art. The channels 42 may be in the form of a slot corresponding to the width of the cleaning strips, or can be a smaller channel, for example of round cross-section with a diameter of less than 5 mm, and typically about 2 mm, through which the cleaning elements can be forced. Other sizes and shapes of channel may be used according to the particular application. A photovoltaic solar panel with one or more through-holes from the back surface to the front surface at locations spaced away from the panel edges is considered to be novel in its own right, and provides opportunities for a wide range of additional applications. The channels may be used for various cleaning arrangements, including wind-displaced cleaning elements and water-spraying cleaning elements, may be used to house various sensors (partially protected from sunlight by the panel) to measure properties of the panel, its operation and/or environmental parameters, and/or may be used for mechanical support for the panel, as an alternative to, or in addition to, mounting via peripheral brackets. In the context of the cleaning elements of the present invention, this approach provides significant advantages for securing of cleaning elements while minimizing any obscuration of radiation reaching the PV cells, and causing the panel itself to shield any spare cleaning element located behind the panel and/or a back surface-mounted cartridge from direct sunlight, thereby prolonging their effective lifetimes.

Optionally, any excess length of the cleaning elements 18 may be allowed to simply hang behind the panel. The required wind-displaced length of each cleaning element 18 may be fixed either by being tight-fitting within channels 42 or by providing a clamping element, exemplified here by a wedge-shaped clip 46 (FIG. 8D), conceptually similar to wedge-shaped clip 36 described above.

In certain particularly preferred implementations, a container, dispenser or cartridge 48 (terms used interchangeably) containing a length of material 32 for deployment as one or more replacement cleaning element is associated with the back surface 44 of the panel. Here too, the provision of such a dispenser to allow convenient storage of replacement lengths of cleaning element behind the panel, and easy deployment of the replacement lengths via a channel passing through the panel, is believed to be of patentable significance in its own right, independent of the other features of the present invention described herein. The structure and function of cartridge 48 is typically similar to that of the front-mounted cartridge 30 described above, except that the outlet for the length of material 32 is typically directly beneath the cartridge. Considerations of size, and optical properties such as reflectivity or translucency discussed above in relation to cartridge 30 are typically not relevant in this case, since the cartridge is not located on the front surface of the panel and therefore does not obstruct any sunlight, except in cases where the back surface is also a radiation-collecting surface. This also allows the use of a relatively larger cartridge with a longer length of material 32, thereby providing for extended use the panel with intermittent replacement of the cleaning elements without requiring refilling or replacing of the cartridges.

FIG. 9 illustrates schematically an option equivalent to that of FIGS. 7A-7F, where the length of material 32 is provided with retaining features 40a, 40b, spaced along its length, for defining a series of stopping positions for the length of material 32 relative to the panel, corresponding to deployment of successive portions of the length of material as replacement cleaning elements. In the non-limiting example illustrated in FIG. 9, features 40a and 40b are spaced apart by a sufficient length to allow them to engage the front and back surfaces, respectively, of the panel. Here too, in some implementations, it may be sufficient to provide only one retaining feature 40b for each length of cleaning element, since no significant force typically acts to return the cleaning element into the cartridge. A pre-defined tear line (not shown here but similar to line 38 of FIG. 7F) is preferably provided behind the retaining features, to facilitate separation of a used cleaning element from a newly deployed replacement cleaning element.

Figure 10:
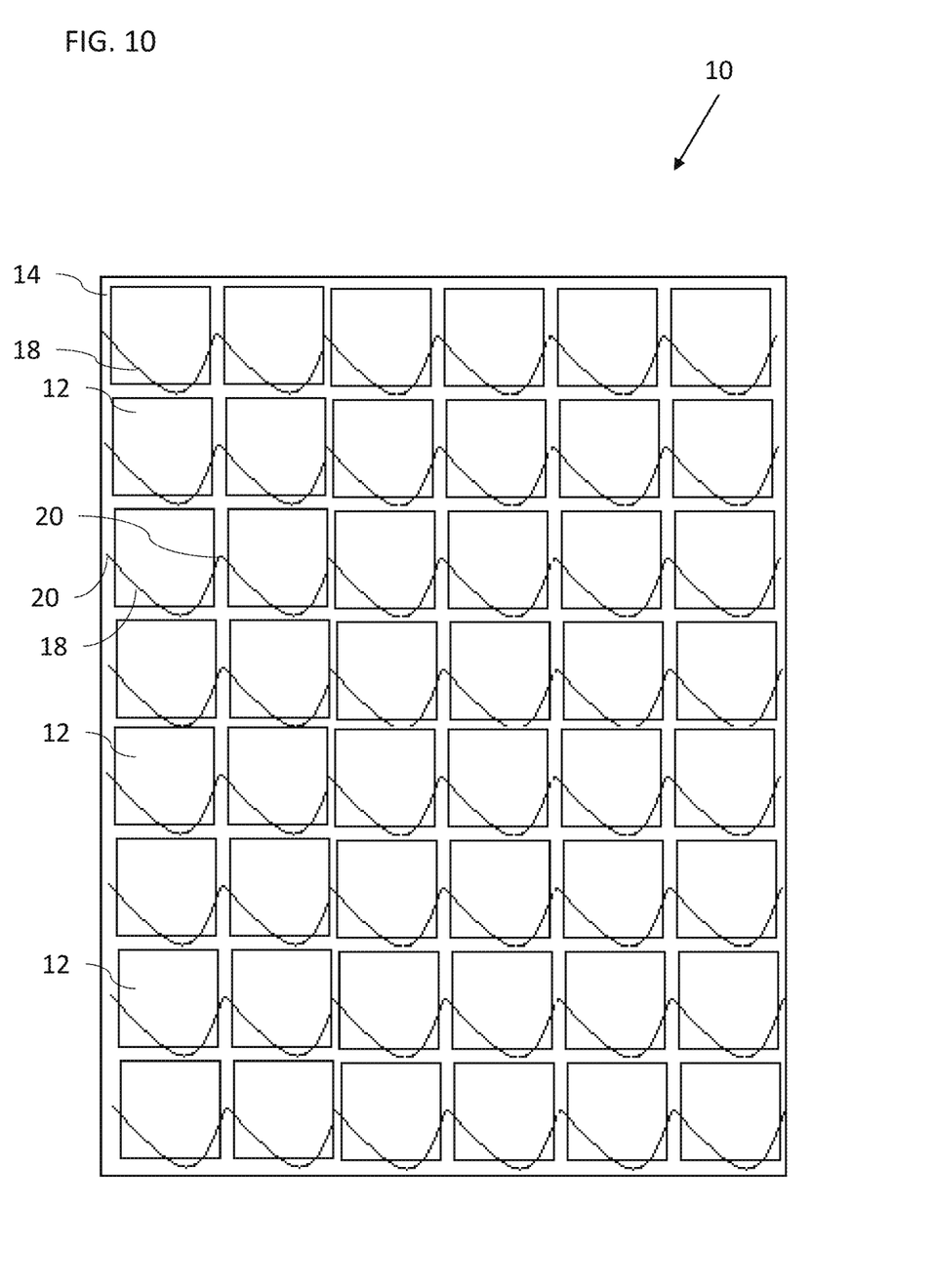
FIG. 10 is a schematic front view of a further variant implementation of the panel of FIG. 1.

Turning finally to FIG. 10, although various implementations of the present invention have been described thus far in examples with cleaning elements anchored at only one end, the invention can also be implemented with other configurations. By way of example, FIG. 10 illustrates an implementation of solar panel 10 in which some or all of cleaning elements 18 are anchored at two ends to the panel surface. The same definitions of a two-dimensional array of the cleaning elements providing coverage of the cells, and the various options of layouts, lengths, and other properties of the cleaning elements and their deployment discussed above all apply equally here, with adjustments where necessary, as will be clear to one ordinarily skilled in the art. Thus, for example, the elements may be deployed one-per-cell as illustrated here, or a single element may be deployed to clean a group of cells, such as four cells. The various options for anchoring the cleaning elements, and for employing cartridges to store a length of replacement cleaning element, are all also relevant here.

It will be appreciated that the above descriptions are intended only to serve as examples, and that many other embodiments are possible within the scope of the present invention as defined in the appended claims.

What is claimed is:

1. A wind-cleaned photovoltaic solar panel comprising:
 (a) an array of photovoltaic cells under a common panel surface, said panel surface having a length and a width, and terminating at panel edges; and
 (b) a two-dimensional array of cleaning elements, each cleaning element anchored to said panel surface at a cleaning-array location on said panel surface, at least one of said cleaning-array locations being spaced away from said panel edges, each of said cleaning elements comprising an elongated wind-displaceable element having a length less than 50 percent of said width of said panel surface.

2. The solar panel of claim 1, wherein said two-dimensional array of cleaning elements includes at least two cleaning-array locations spread across a width of said panel surface spaced away from said panel edges, and at least two cleaning-array locations spread along a length of said panel surface spaced away from said panel edges.

3. The solar panel of claim 1, wherein at least one of said cleaning-array locations is located at the center of a photovoltaic cell.

4. The solar panel of claim 1, wherein each of said photovoltaic cells has a cleaning-array location at its center.

5. The solar panel of claim 1, wherein at least one of said cleaning-array locations is located at a marginal area adjacent to at least two photovoltaic cells.

6. The solar panel of claim 1, wherein at least one of said cleaning-array locations is located at a marginal area adjacent to at least three photovoltaic cells.

7. The solar panel of claim 1, wherein at least one of said cleaning elements comprises a strip of flexible material having a thickness less than 80 microns, a width less than 1.5 cm, and a wind-displaceable length less than 50 cm.

8. The solar panel of claim 1, wherein at least one of said cleaning elements has a wind-displaceable length between 8 centimeters and 35 centimeters.

9. The solar panel of claim 1, wherein at least one of said cleaning elements has a wind-displaceable length between 65 percent and 110 percent of a distance between adjacent cleaning-array locations.

10. The solar panel of claim 1, wherein at least one of said cleaning elements is anchored to said panel surface via an anchoring arrangement attached to said panel surface.

11. The solar panel of claim 10, wherein said anchoring arrangement comprises a barbed projection for engaging a cleaning element.

12. The solar panel of claim 10, wherein said anchoring arrangement is integrated with a cartridge containing a storage volume storing a length of material for deployment as a replacement cleaning element.

13. The solar panel of claim 12, wherein said cartridge has a reflective outer surface for reflecting sunlight towards said photovoltaic cells.

14. The solar panel of claim 12, wherein said cartridge is formed primarily from translucent material.

15. The solar panel of claim 1, wherein at least one of said cleaning elements passes through a channel extending from a back surface of the panel through said panel surface.

16. The solar panel of claim 15, further comprising a cartridge associated with said back surface of the panel for said cleaning element, said cartridge containing a storage volume storing a length of material for deployment as a replacement cleaning element.

17. The solar panel of claim 1, further comprising a cartridge associated with at least one of said cleaning elements, said cartridge containing a storage volume storing a length of material, contiguous with said cleaning element, for deployment as a replacement cleaning element, said length of material including weakened tear-lines to facilitate disconnection of an old cleaning element when deploying a replacement cleaning element.

18. The solar panel of claim 17, wherein said length of material is provided with retaining features, spaced along its length, for defining a series of stopping positions for said length of material relative to said cartridge corresponding to deployment of successive portions of said length of material as replacement cleaning elements.

19. The solar panel of claim 1, wherein said panel is a flexible panel.

20. The solar panel of claim 1, further comprising a flexible bag associated with at least one of said cleaning elements, said flexible bag containing a storage volume storing a length of material, contiguous with said cleaning element, for deployment as a replacement cleaning element.

21. The solar panel of claim 1, wherein at least one of said cleaning elements is anchored at two ends to said panel surface.

22. A wind-cleaned photovoltaic solar panel comprising:
(a) an array of photovoltaic cells under a common panel surface, said panel surface having a length and a width, and terminating at panel edges; and
(b) a two-dimensional array of cleaning elements, each cleaning element anchored to said panel surface at a cleaning-array location on said panel surface, at least one of said cleaning-array locations being spaced away from said panel edges, each of said cleaning elements comprising an elongated wind-displaceable element having a length less than said width of said panel surface.

* * * * *